(12) United States Patent
Teo et al.

(10) Patent No.: US 7,474,801 B2
(45) Date of Patent: Jan. 6, 2009

(54) AUTOMATIC GENERATION OF A PHOTO ALBUM

(75) Inventors: Patrick C. Teo, San Mateo, CA (US); Su M. Quek, San Francisco, CA (US); Kai Bansner, San Francisco, CA (US); John T. Townsend, Jr., Fremont, CA (US)

(73) Assignee: Shutterfly, Inc., Redwood City, CA (US)

( * ) Notice: Subject to any disclaimer, the term of this patent is extended or adjusted under 35 U.S.C. 154(b) by 573 days.

(21) Appl. No.: 11/176,049

(22) Filed: Jul. 7, 2005

(65) Prior Publication Data

US 2007/0019924 A1 Jan. 25, 2007

(51) Int. Cl.
*G06T 3/00* (2006.01)

(52) U.S. Cl. .................. 382/284; 358/1.18; 715/243

(58) Field of Classification Search .................. 345/629, 345/581, 769, 634, 635; 358/1.9, 1.18, 450; 348/788; 382/154, 175, 284, 309, 100, 294, 382/295; 705/26; 707/10; 715/243, 246, 715/253
See application file for complete search history.

(56) References Cited

U.S. PATENT DOCUMENTS

| | | | |
|---|---|---|---|
| 5,974,401 A | 10/1999 | Enomoto | |
| 6,017,157 A | 1/2000 | Garfinkle et al. | |
| 6,064,397 A | 5/2000 | Herregods | |
| 6,154,295 A | 11/2000 | Fredlund | |
| 6,282,330 B1 * | 8/2001 | Yokota et al. | 382/309 |
| 6,288,719 B1 | 9/2001 | Squilla | |
| 6,349,194 B1 | 2/2002 | Nozaki | |
| 6,362,900 B1 | 3/2002 | Squilla | |
| 6,388,732 B1 | 5/2002 | William | |
| 6,570,640 B1 | 5/2003 | Garfinkle et al. | |
| 6,591,005 B1 * | 7/2003 | Gallagher | 382/154 |
| 6,636,648 B2 * | 10/2003 | Loui et al. | 382/284 |
| 6,667,814 B1 | 12/2003 | Tillotson | |
| 6,727,909 B1 * | 4/2004 | Matsumura et al. | 345/629 |

(Continued)

FOREIGN PATENT DOCUMENTS

EP        975147 A2 *   1/2000

(Continued)

OTHER PUBLICATIONS

Yagawa et al. "The Digital Album: A Personal File-tainment System." IEEE Proceedings of Multimedia '96. pp. 433-439.*

(Continued)

*Primary Examiner*—Andrew W Johns
(74) *Attorney, Agent, or Firm*—Xin Wen

(57) ABSTRACT

A method for producing a digital photo album includes selecting a plurality of digital images each characterized by a portrait format or a landscape format, providing a library of page layouts each comprising one or more image areas configured to receive digital images. Each of the image areas is characterized by an image area format consistent with the image format. One or more page layouts are automatically selected from the library of page layouts in accordance with the selected digital images and their associated image formats. The selected digital images are disposed in the image areas on the one or more page layouts to produce one or more pages in the digital photo album.

20 Claims, 17 Drawing Sheets

U.S. PATENT DOCUMENTS

| | | | |
|---|---|---|---|
| 6,771,801 B1 * | 8/2004 | Fisher et al. | 382/112 |
| 6,915,273 B1 * | 7/2005 | Parulski | 705/26 |
| 2001/0035875 A1 * | 11/2001 | Suzuki et al. | 345/723 |
| 2002/0087546 A1 * | 7/2002 | Slater et al. | 707/10 |
| 2002/0122067 A1 * | 9/2002 | Geigel et al. | 345/788 |
| 2003/0072486 A1 * | 4/2003 | Loui et al. | 382/175 |
| 2003/0122839 A1 * | 7/2003 | Matraszek et al. | 345/581 |
| 2003/0160824 A1 * | 8/2003 | Szumla | 345/769 |
| 2004/0032599 A1 * | 2/2004 | Atkins et al. | 358/1.9 |
| 2005/0168779 A1 * | 8/2005 | Tsue et al. | 358/1.18 |

FOREIGN PATENT DOCUMENTS

| | | |
|---|---|---|
| EP | 1093090 A1 * | 9/2000 |
| WO | WO 01/82231 A2 * | 11/2001 |

OTHER PUBLICATIONS

Geigel, J. et al., "Using genetic algorithms for album page layouts", Oct.-Dec. 2003, IEEE MultiMedia. pp. 16-27.*

* cited by examiner

Select pictures

☐ ☐ ☐

☐ ☐ ☐

☐ ☐ ☐

420     410

| pictures 10-18 | ∨ |

Previous page     Next Page

Select the number of images on each page of your photo album

☐ 1 image per page

☐ 2 images per page

☐ 3 images per page

☐ A mixed number of images per page

AUTOMATIC GENERATION OF A PHOTO ALBUM

CROSS-REFERENCES TO RELATED INVENTIONS

The present invention is related to commonly assigned U.S. patent application Ser. No. 10/106,902, filed on Mar. 25, 2002, titled "Producing and sharing personalized photo calendars" and U.S. patent application Ser. No. 11/086,579, filed on Mar. 22, 2005, titled "Utilization of digital images". The disclosure of these related applications are incorporated herein by reference.

TECHNICAL FIELD

This application relates to utilization of digital images, specifically the design and production of products based on digital images.

BACKGROUND

In recent years, photography has been rapidly transformed from chemical based technologies to digital imaging technologies. Digital images captured by digital cameras can be stored in computers and viewed on display devices. Users can also produce image prints based on the digital images. Such image prints can be generated locally using output devices such an inkjet printer or a dye sublimation printer or remotely by a photo printing service provider. Other products that can be produced using the digital images can include photo books, photo calendars, photo mug, photo T-shirt, and so on. A photo book can include a cover page and a plurality of image pages each containing one or more images. Designing a photo album can include many iterative steps such as selecting suitable images, selecting layout, selecting images for each page, add text, and rearrange the images and text, which can be quite time consuming. It is desirable to provide methods to allow users to design and produce photo albums in a time efficient manner.

SUMMARY

In one aspect, the present application relates to a method for producing a digital photo album having a plurality of pages, comprising:
  selecting a plurality of digital images each characterized by an image format selected from the group of a portrait format and a landscape format;
  providing a library of page layouts each comprising one or more image areas configured to receive the selected digital images, wherein each of the image areas is characterized by an image area format consistent with image format;
  automatically selecting one or more page layouts from the library of page layouts in accordance with the selected digital images and their associated image formats; and
  disposing the selected digital images in the image areas on the one or more page layouts to produce one or more pages in the digital photo album.

In another aspect, the present application relates to a method for producing a digital photo album having a plurality of pages, comprising:
  selecting a plurality of digital images each characterized by an image format selected from the group of a portrait format and a landscape format;
  providing a library of page layouts each comprising one or more image areas configured to receive the selected digital images, wherein each of the image areas is characterized by an image area format consistent with image format;
  automatically selecting one or more page layouts from the library of page layouts in response to the selected digital images and their associated image formats;
  automatically matching the image formats of the selected digital images with the image area formats of the image areas in the page layouts; and
  disposing the selected digital images in the image areas on the one or more page layouts to produce one or more pages in the digital photo album.

In another aspect, the present application relates to a method for producing a digital photo album having a plurality of pages, comprising:
  selecting a plurality of digital images each characterized by an image format selected from the group of a portrait format and a landscape format;
  specifying a sequence for the selected digital images;
  providing a library of page layouts each comprising one or more image areas configured to receive the selected digital images, wherein each of the image areas is characterized by an image area format consistent with image format;
  automatically selecting one or more page layouts from the library of page layouts in response to the sequence and the image formats of the selected digital images; and
  disposing the selected digital images in the image areas on the one or more page layouts to produce one or more pages in the digital photo album.

The disclosed photo album book can include an equal number or different numbers of images on different pages of a digital photo album. The number of images can be preselected by a user or automatically determined by the computer. In addition to containing one or more digital images, each page of the digital photo album may also contains one or more captions, dedicated to one or more digital images on the same page. The design of each page layout may also include a background. For each page layout, there may be multiple page backgrounds for a user to choose from. There can be multiple page backgrounds through out the different pages of the same digital photo album.

One or more features of the present invention include the following. The image formats of the selected digital images can be automatically matched with the image area formats of the image areas in the page layouts. A sequence for the selected digital images can be selected. One or more page layouts can be automatically selected from the library of page layouts for one or more pages in the digital photo album in response to the sequence of the selected digital images. One or more page layouts automatically selected from the library of page layouts in response to a combination of image formats of two or more selected digital images. The one or more pages in the digital photo album can be displayed having the selected digital images disposed in the image areas on the one or more page layouts. The selected digital images can be cropped. The cropped digital images can be disposed in the image areas on the one or more page layouts. A portion of one of the selected digital images can be selected. The portion of the selected digital image in an image area on one of the page layouts can be displayed. The page layout can further include one or more image caption areas. The page layout can further include a page background pattern. The page background pattern can be selected from a plurality of pre-designed page background patterns. The number of the image areas on the one or more page layouts can be selected from the library of page layouts. A page layout comprising two image areas can be selected from the library of page layouts. The image area formats of the two image areas can include one or more portrait formats or one or more landscape image area formats.

DRAWING DESCRIPTIONS

In order that the manner in which the above-recited and other advantages and features of the invention are obtained, a more particular description of the invention briefly described above will be rendered by reference to specific embodiments thereof, which are illustrated, in the appended drawings. Understanding that these drawings depict only typical embodiments of the invention and are not therefore to be considered to be limiting of its scope, the invention will be described and explained with additional specificity and detail through the use of the accompanying drawings in which:

The accompanying drawing, which are incorporated in and form a part of this specification, illustrate embodiments of the invention and, together with the description, serve to explain the principles of the invention:

FIG. 6(a)-6(i) illustrate a library of page layouts having different number of images or different image formats.

FIG. 7 illustrates a user interface for selecting the number of images per page.

Figure 8:
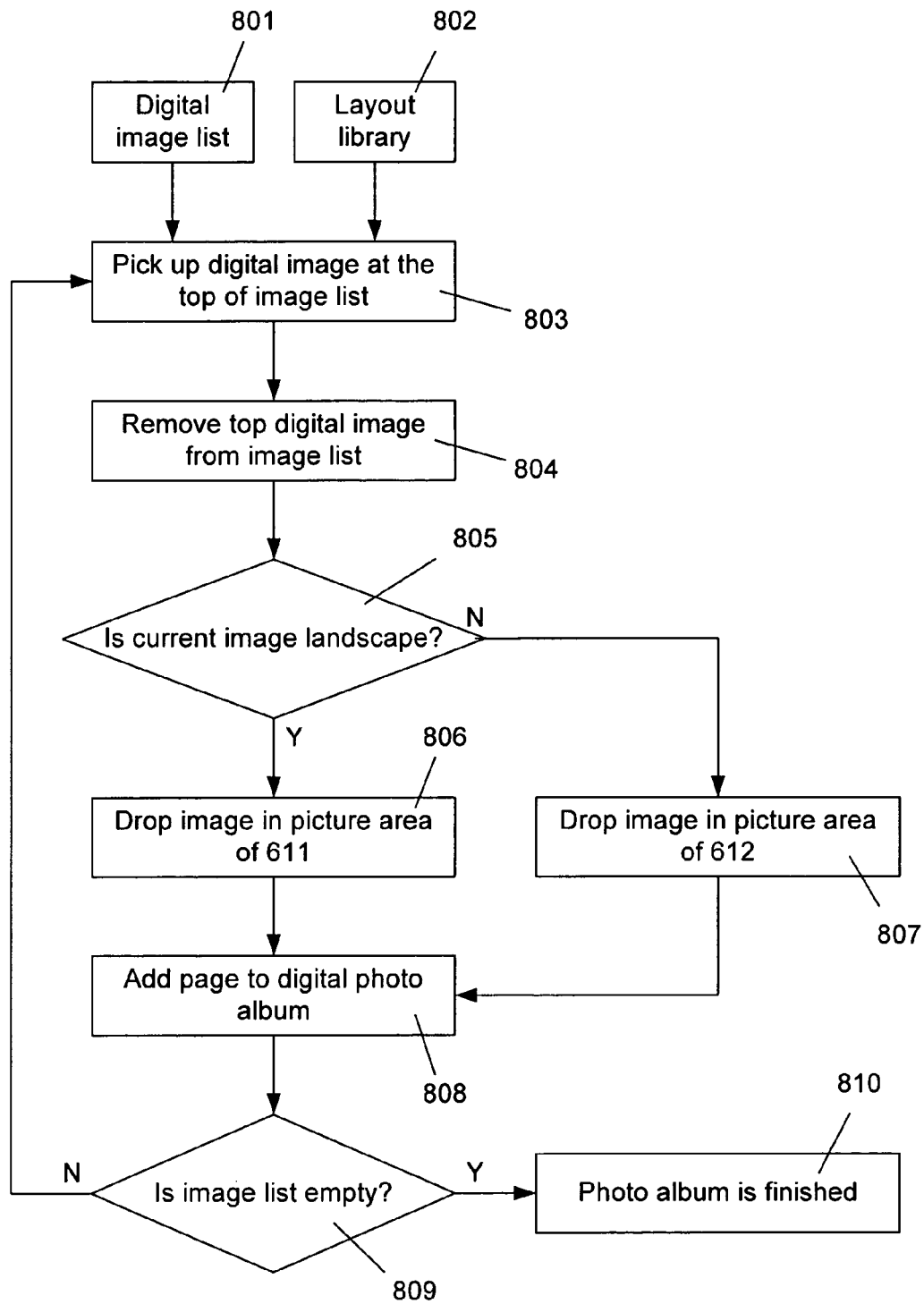

FIG. 8 illustrates a flow chart for automatic generating a photo album in accordance with an embodiment of the present invention.

Figure 9:
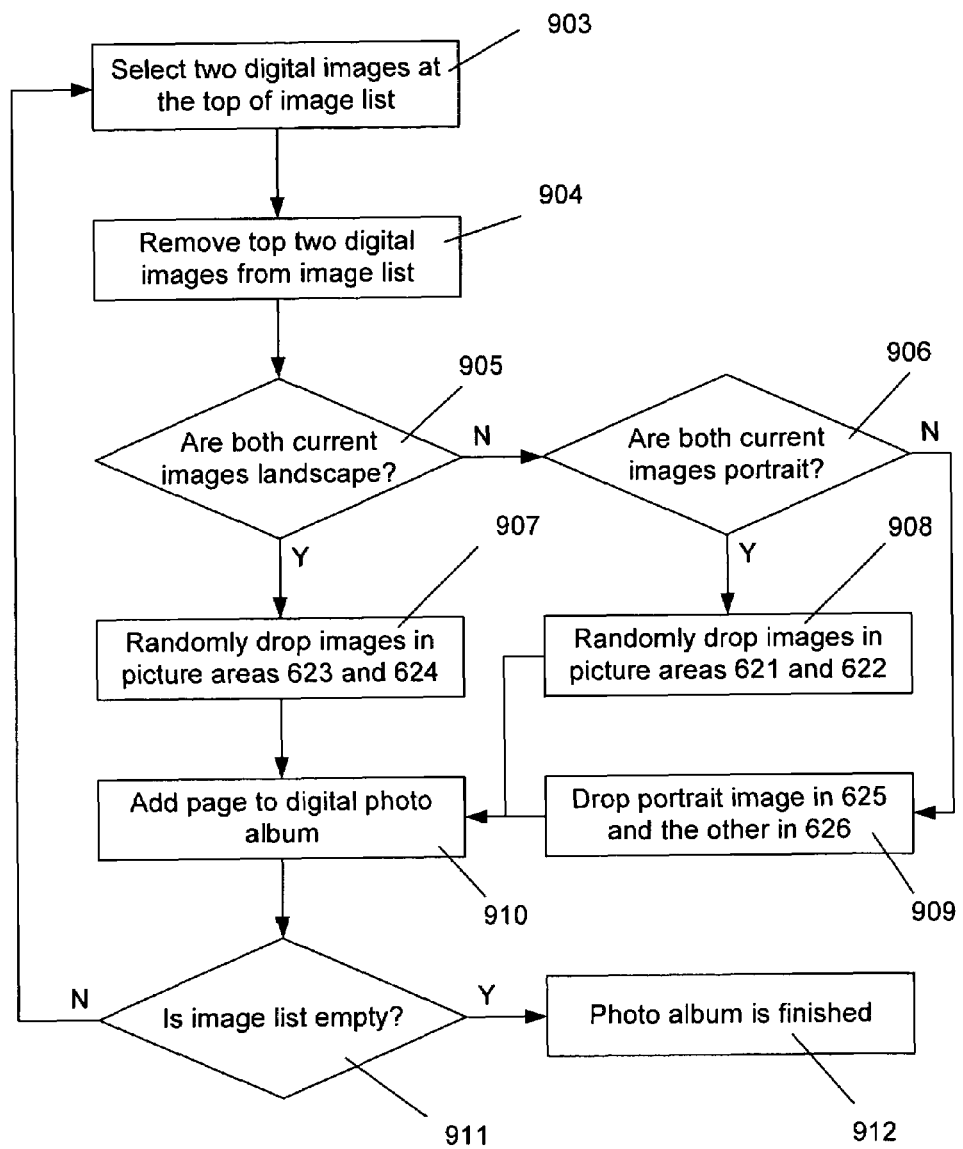

FIG. 9 illustrates a flow chart for automatic generating a digital photo album in accordance with another embodiment of the present invention.

Figure 10:
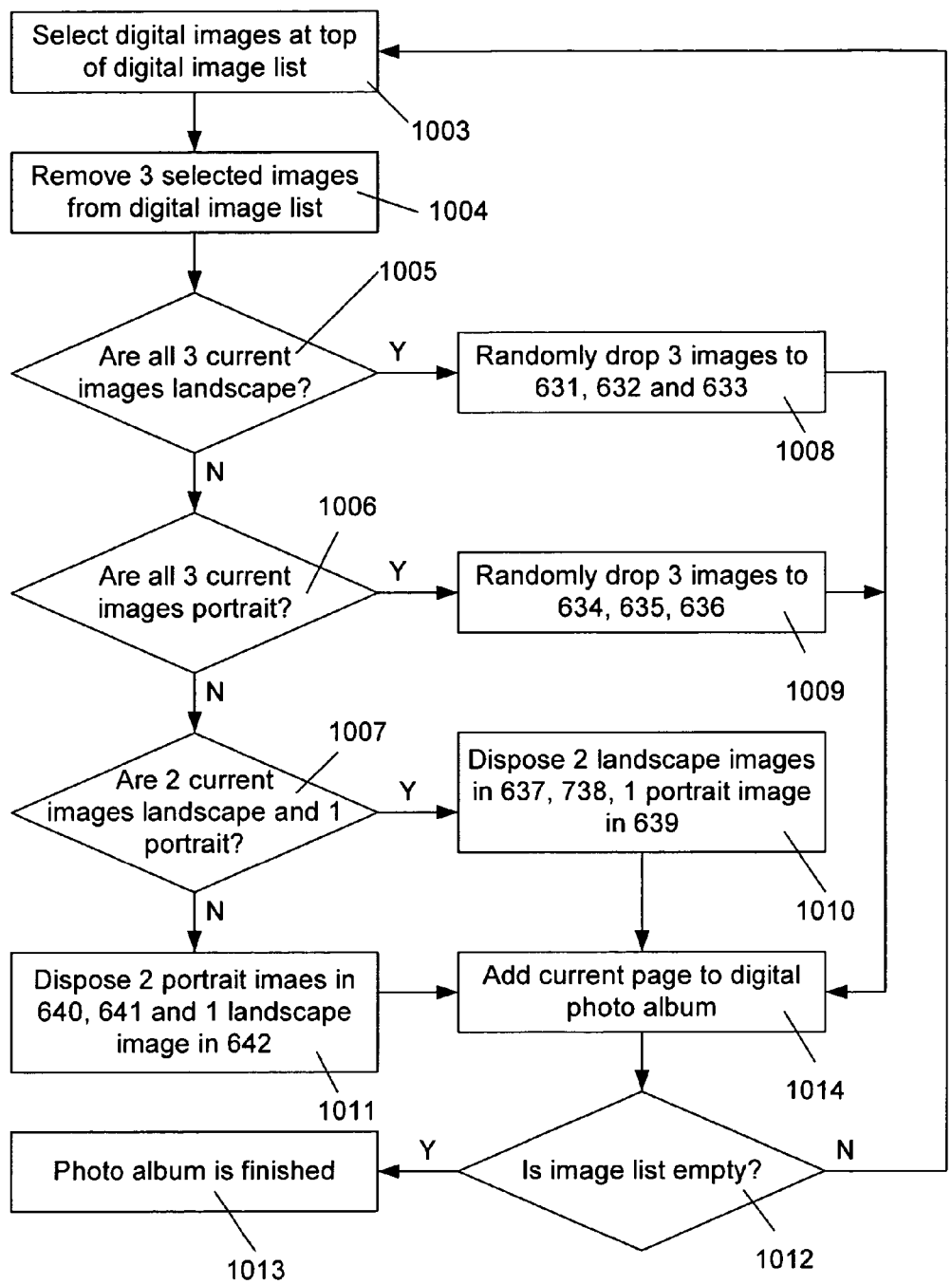

FIG. 10 illustrates a flow chart for automatic generating a digital photo album in accordance with another embodiment of the present invention.

Figure 11:
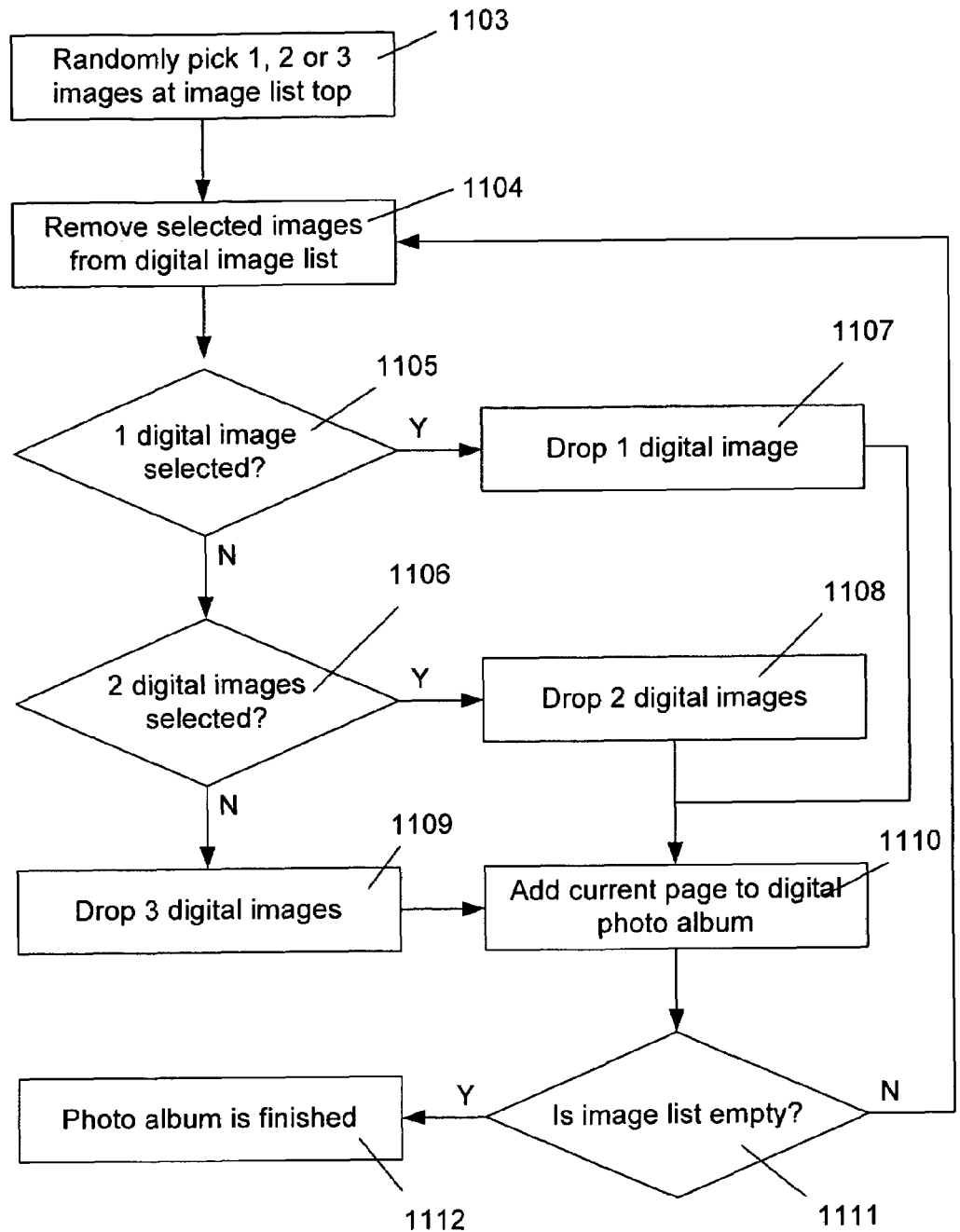

FIG. 11 illustrates a flow chart for automatic generating a digital photo album in accordance with another embodiment of the present invention.

Figure 12:
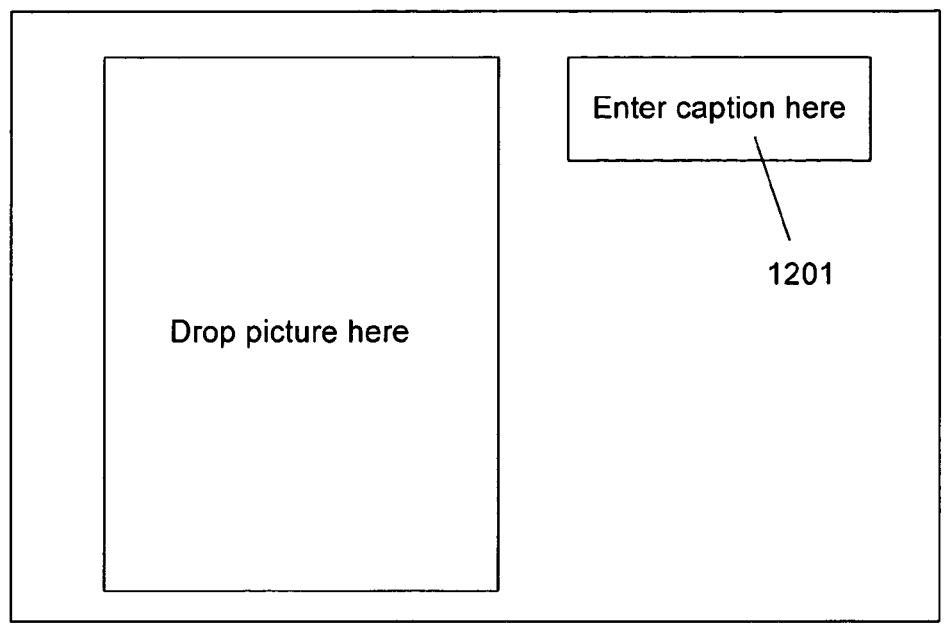
Figure 12:
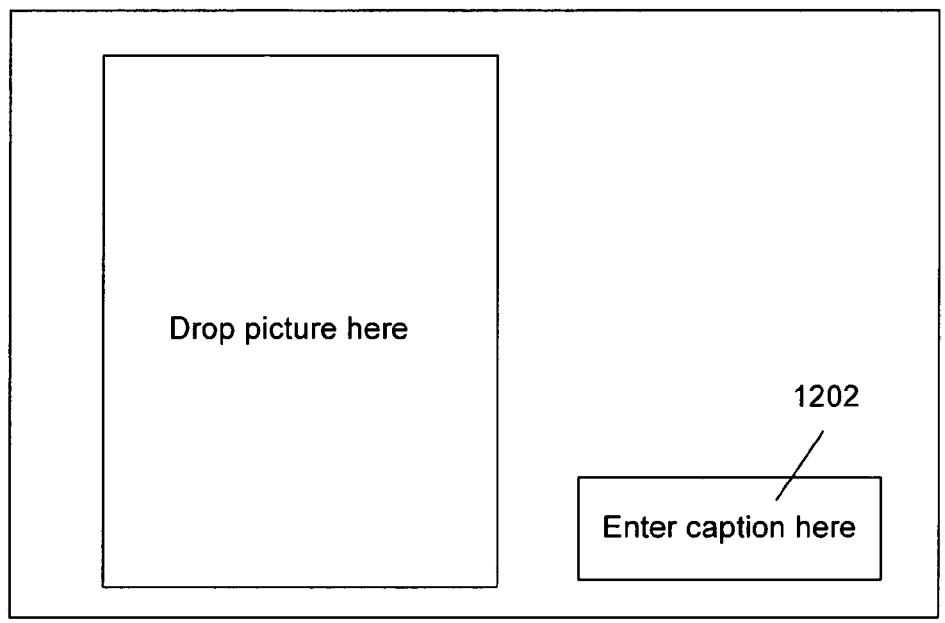

FIG. 12 illustrates a photo-album page with a caption area reserved.

Figure 13:
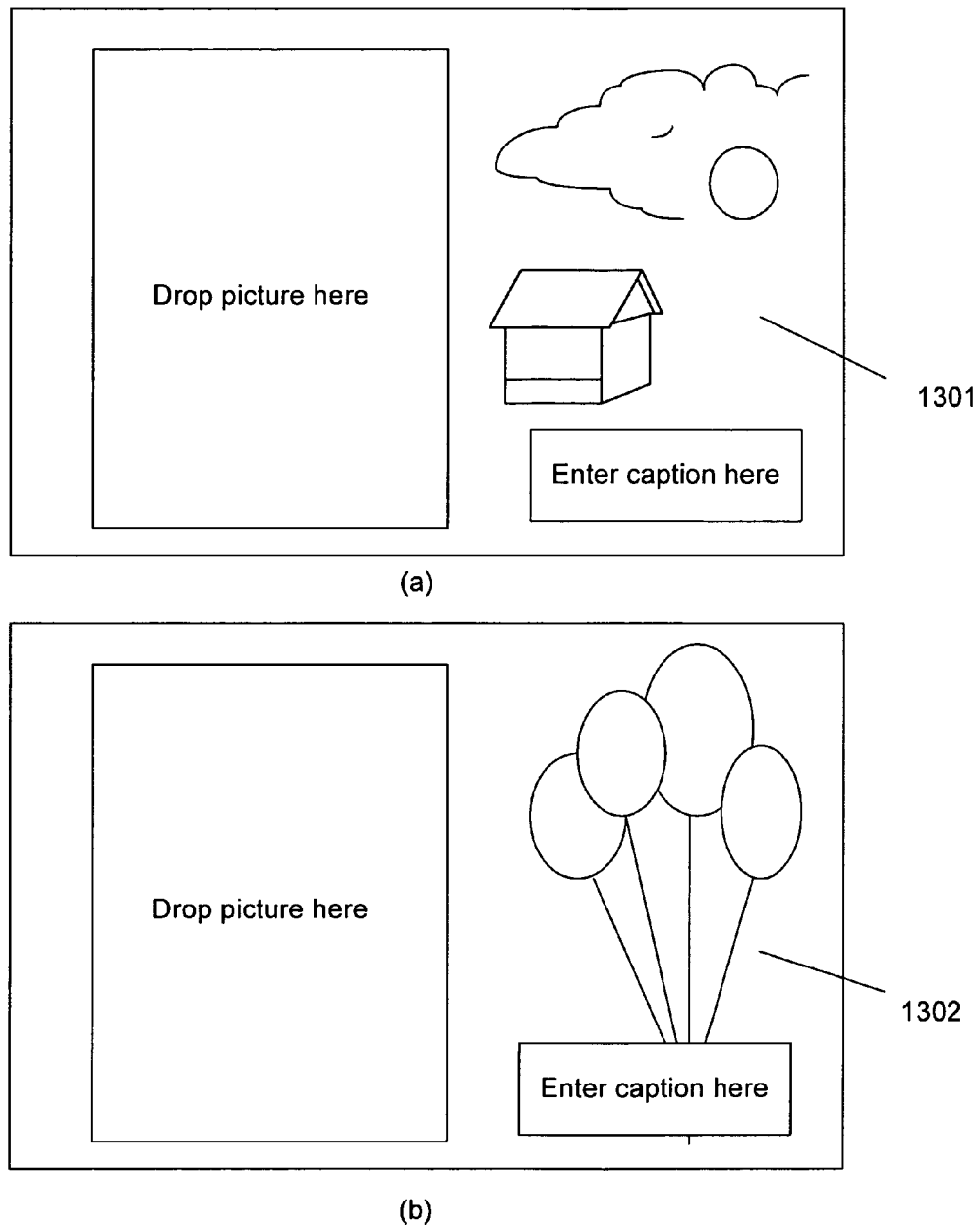

FIG. 13 illustrates a photo-album page with different background pre-defined.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

In the present invention, the term "photo album" refers to a book that includes one or two cover pages and one or more image pages. Each of the image pages can include one or more images. The image pages can also include text or image caption. The image layout can also include a background pattern. In the imaging industry, photo albums can include photo books, scrapbooks, snap books, and any books form including bound image pages.

Figure 1:
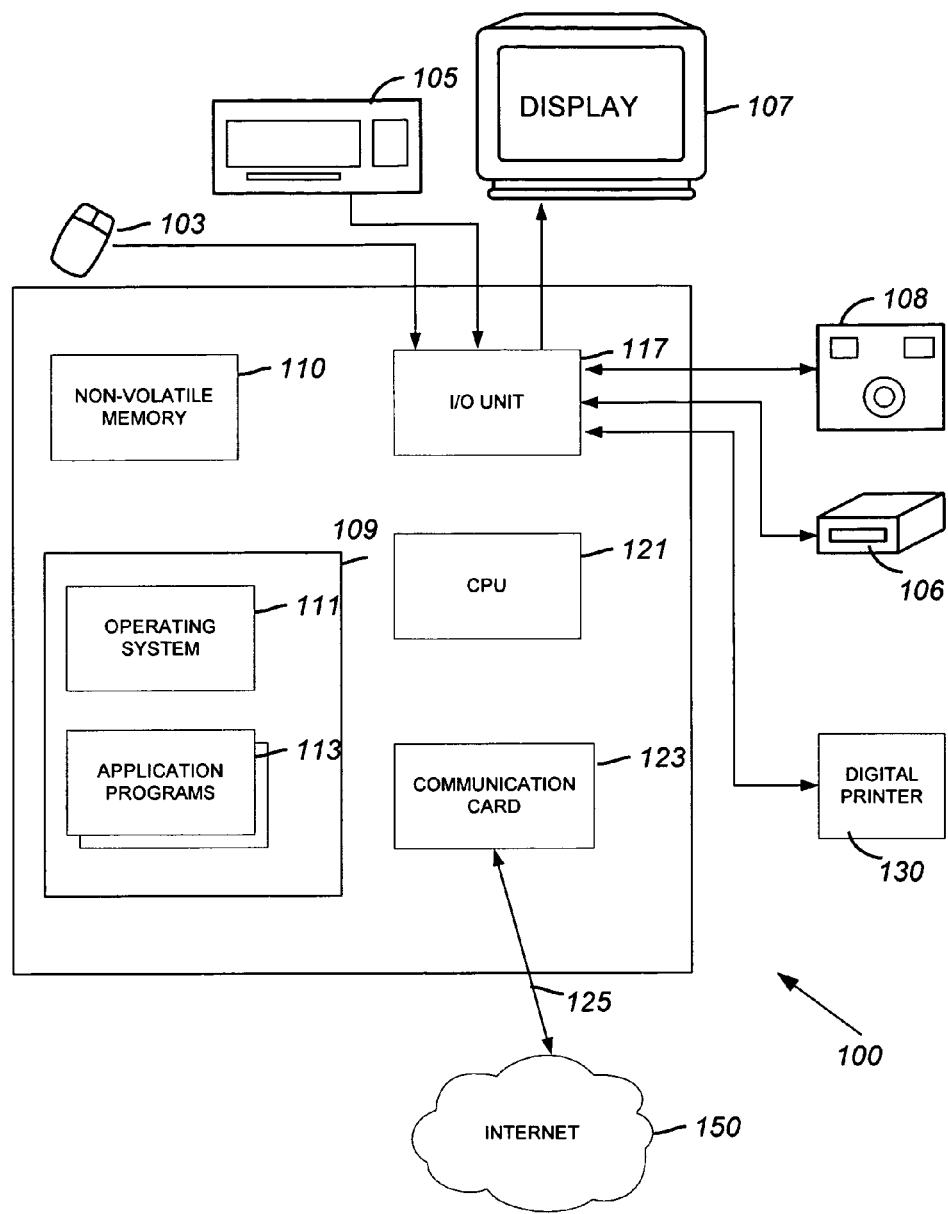
FIG. 1 is a block diagram of a computer system.

A computer system 100 illustrated in FIG. 1 represents a typical hardware setup for executing software that allows a user to perform tasks such as communicating with other computer users, accessing various computer resources, and viewing, creating, or otherwise manipulating electronic content, that is, any combination of text, images, movies, music or other sounds, animations, 3D virtual worlds, and links to other objects. The system includes various input/output (I/O) devices (mouse 103, keyboard 105, display 107) and a general purpose computer 100 having a central processor unit (CPU) 121, an I/O unit 117 and a memory 109 that stores data and various programs such as an operating system 111, and one or more application programs 113. The computer system 100 also typically includes non-volatile memory 110 (e.g., flash RAM, a hard disk drive, and/or a floppy disk or other removable storage media) and a communications card or device 123 (e.g., a modem or network adapter) for exchanging data with a network 127 via a communications link 125 such as a cable modem, DSL service or wireless Internet connection.

The computer 100 of FIG. 1 also can be connected to various peripheral I/O devices. One of the more popular of such peripheral devices is a digital camera 108. The digital camera 108 enables users to take pictures (i.e., images), which are saved in memory (not shown) within the digital camera 108 in a digital (electronic) format. After taking and storing the images, the user can connect the digital camera 108 to a computer system 100 in order to upload the digital images to the computer's disk drive or other non-volatile memory 110. The user can also wirelessly transfer digital images in the digital camera to the computer system 100. Once the digital images are uploaded to the computer system 100, the user can erase the digital images from the memory of the digital camera 108 so that the user can take and store additional images using the digital camera 108. Typically, the digital camera 108 is connected to the computer 100 only while the user is uploading images to the computer's disk drive or other non-volatile memory 110.

Users also can obtain digital images, for example, of film-based prints from a traditional camera, by sending an exposed film into a photo-finishing service, which develops the film to make prints and then scans (or otherwise digitizes) the prints or negatives to generate digital image files. The digital image files then can be transmitted back to the user by e-mail or on a CD-ROM, diskette, or other removable storage medium.

Once the digital images are stored on the computer 100, a user can perform various operations on them. For example, an image viewer application can be used to view the images or a photo editor application can be used to touch-up or otherwise modify the images. In addition, an electronic messaging (e.g., e-mail) application can be used to transmit the digital images to other users.

In addition to viewing the digital images on the computer display 107, users often desire to have hard copies based on the digital images. Such hard copies can be generated locally by the user using output devices such an inkjet printer or a dye sublimation printer 130 or remotely for a photo printing service provider. Other products based on the digital images can include photo books, photo calendars, photo mug, photo T-shirt, and so on. A photo book can include a cover page and a plurality of image pages each containing one or more images. Each page can also include different formats. Designing a photo album can include many iterative steps such as selecting suitable images, selecting layout, selecting images for each page, add text, which can be quite time consuming. It is desirable to provide methods for designing and producing photo albums that can substantially save a user's time.

Figure 2:
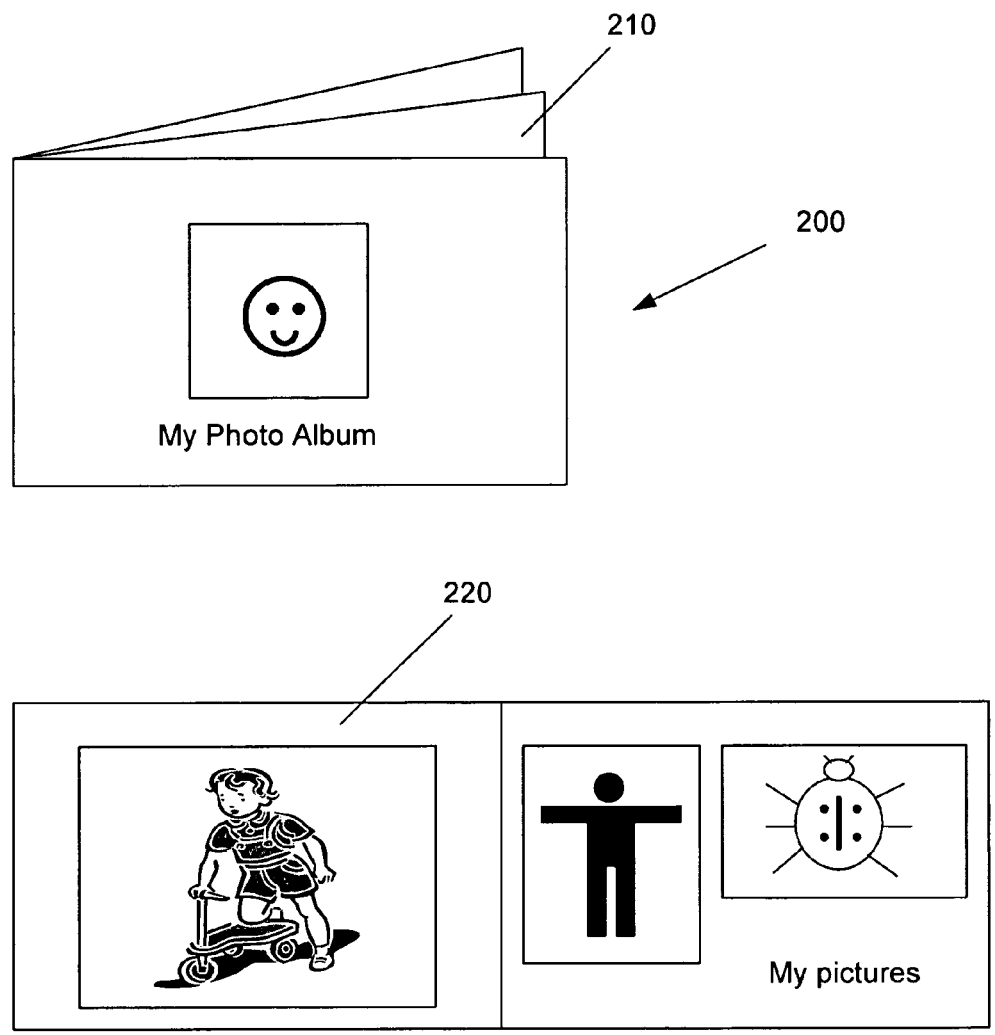
FIG. 2 illustrates a photo album.

FIG. 2 shows a photo album 200 comprising a plurality of many pages 210, each including one or more digital images 220 provided by a user. The user can select a layout for each page and select digital images 220 for each page.

Figure 3:
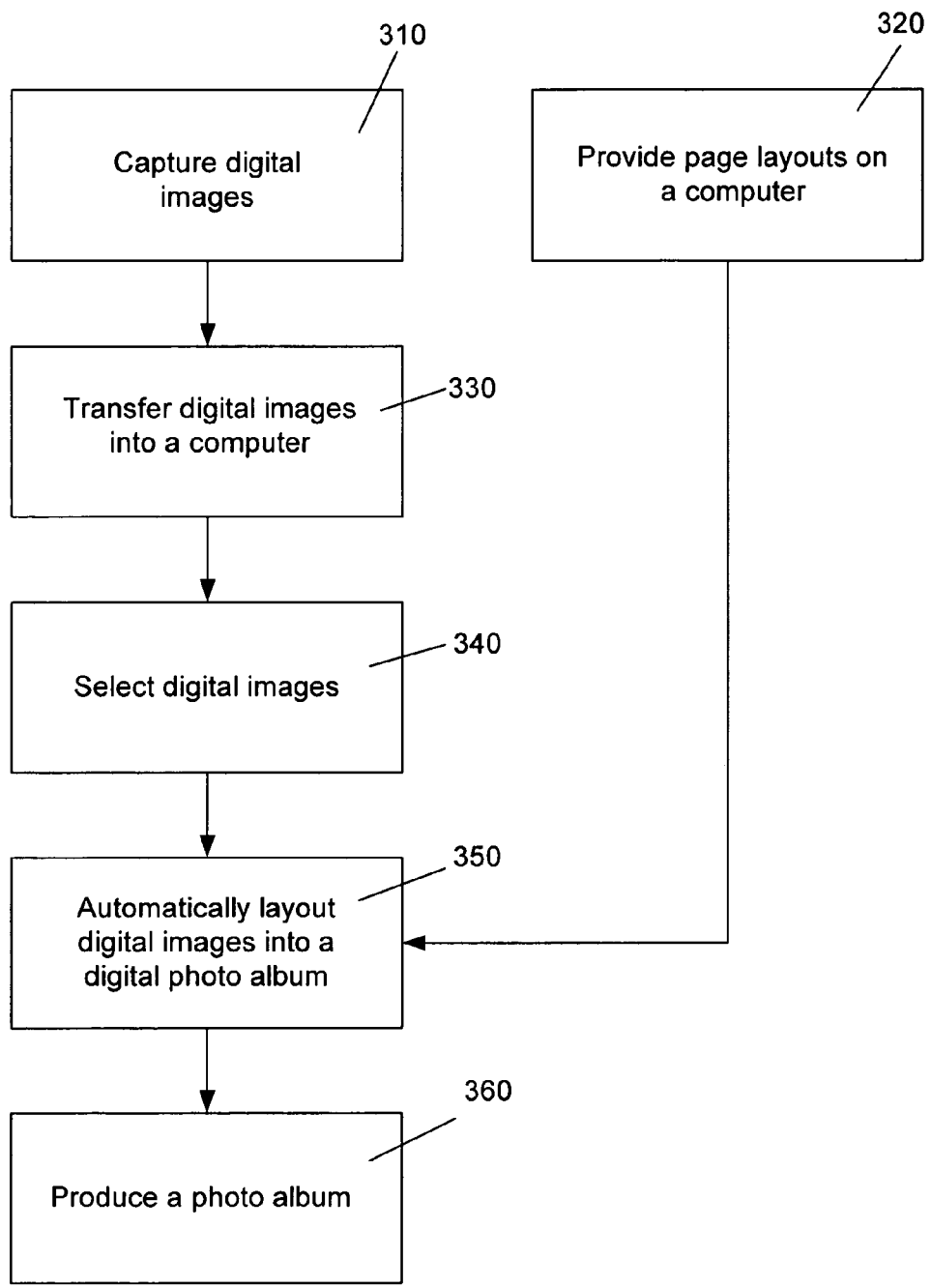
FIG. 3 is a flow chart for creating a digital photo album.

FIG. 3 is a block diagram to show the process of creating a digital photo album 200. Digital images are captured in step 310, by taking pictures using a digital camera, copying existing digital images through the Internet, or by any other method. In step 330, the captured digital images are then transferred to a computer system 100 and stored in the computer system. In step 340, a user selects a list of digital images on the computer system 100 to be used in a digital photo album. A set of page layouts for the digital photo album is provided in step 320. The page layouts can include different number of images on an album page, different combination of landscape and portrait images on an album page.

Digital images typically have rectangle shapes defined by a lateral dimension along a substantially horizontal direction and a vertical dimension along a substantially vertical direction. A landscape format refers to images that have longer lateral dimensions than the vertical dimensions when the images are properly aligned. In contrast, the portrait format refers to images that have longer vertical dimensions than lateral dimensions. Both landscape and portrait images can be presented slightly tilted for artistic presentation. A square image can be specified as either a portrait or a landscape image.

In step 350, the computer system 100 automatically populates the digital images in the image listed created in step 340, based on the library of page layouts created in step 320, and a digital photo album is generated in the form of electronic file inside the computer system 100. In step 260, the electronic file for the digital photo album is sent to a digital printer to print out a hard copy of the digital photo album 200.

Figure 4:
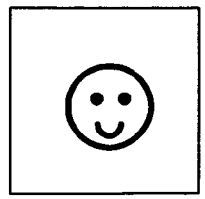
FIG. 4 illustrates a list of digital images.
Figure 4:
Figure 4:
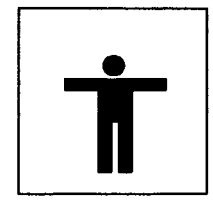
Figure 4:
Figure 4:
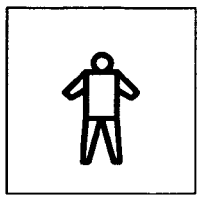
Figure 4:
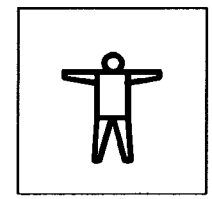
Figure 4:
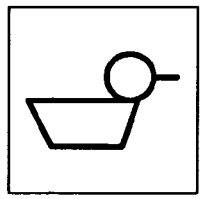
Figure 4:
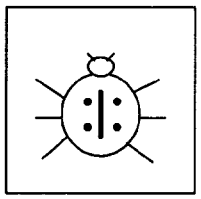
Figure 4:
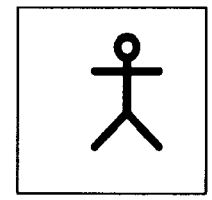
Figure 4:
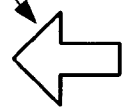
Figure 4:
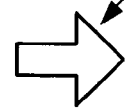

With thousands of digital images stored in a computer system 100, the first step of making a digital photo album is to select digital images to be included in the digital photo album 200. FIG. 4 shows a portion of the digital images that are candidates for the digital photo album 200. By clicking on the small square below each of the digital images in FIG. 5, the digital image is selected into the digital image list. The corresponding digital image will be printed in the digital photo album 200. More digital images can be viewed and selected into the digital image list by clicking the "next page" button 410 or the "previous page" button 420.

Figure 5:
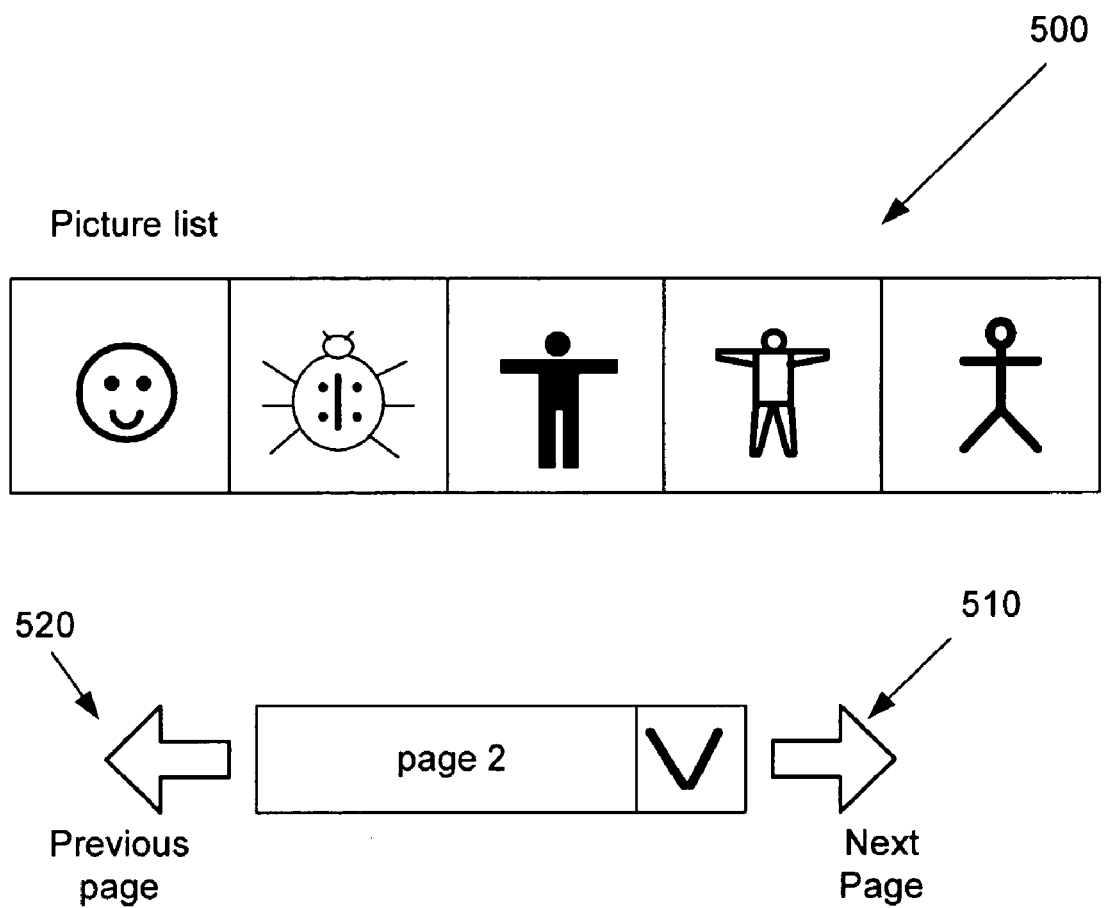
FIG. 5 illustrates a subset of the list of the digital images.

FIG. 5 shows a portion of the digital image list 500. Only five digital images are shown in FIG. 5, while the digital image list 500 may contain more digital images, which can be viewed by clicking the "next page" button 510 or the "previous page" button 520.

The digital image list 500 in FIG. 5 not only includes information of which digital images will be included in the digital photo album 200 to be created, but also the digital image list 500 includes the information of the order of the digital images to be produced in the digital photo album 200. The order of the digital images in the digital image list 500 will be the same order that digital images are produced in the digital photo album. The digital images in the digital image list 500 can be put in order in any way the user likes. For example, digital images can be in order by time, or they can be in order by event.

With a digital image list 500 ready, a library of page layout needs to be prepared before the digital images in the digital image list 500 can be used to create a digital photo album 200. A page layout is a definition of one or multiple areas on a page for digital images to be printed. Such an area for a digital image is usually in a rectangle or square shape, although a circle or an oval shape may also be available.

Based on the ratio of the horizontal dimension over the vertical dimension, an area for a digital image can be of three types: portrait, landscape, or square. A portrait area is an area whose horizontal dimension is shorter than its vertical dimension. A landscape area is an area whose horizontal dimension is longer than its vertical dimension. A square area is an area whose horizontal and vertical dimensions are equal to each other.

Figure 6:
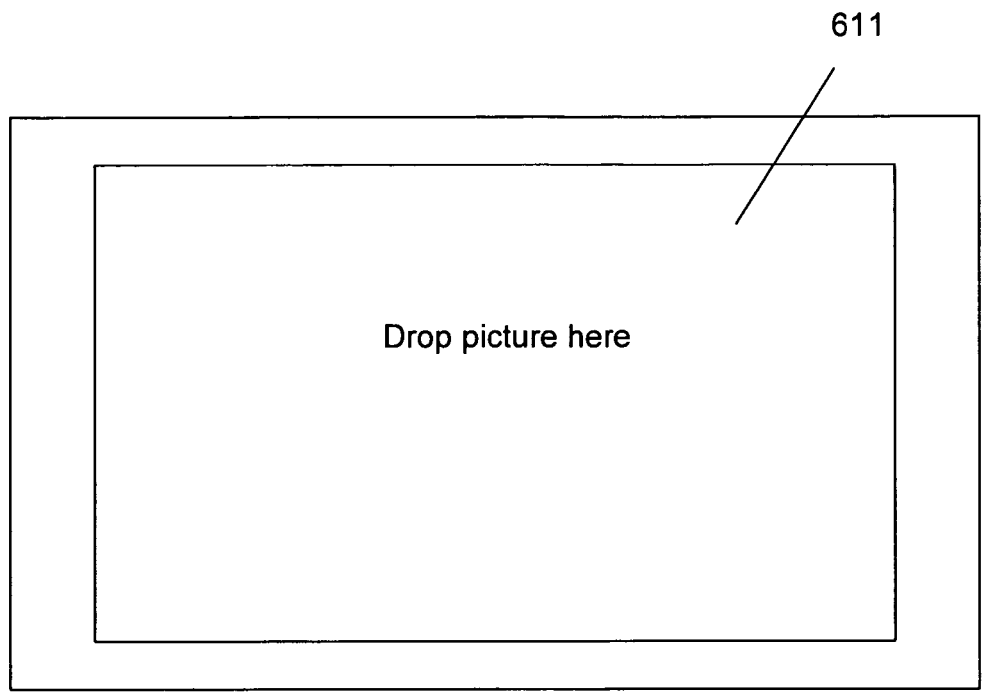
Figure 6:
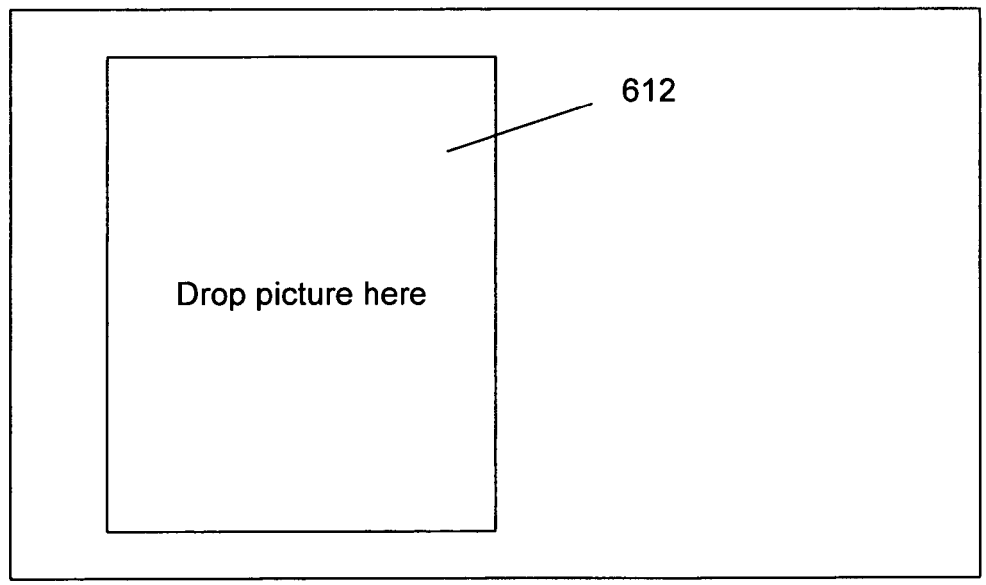
Figure 6:
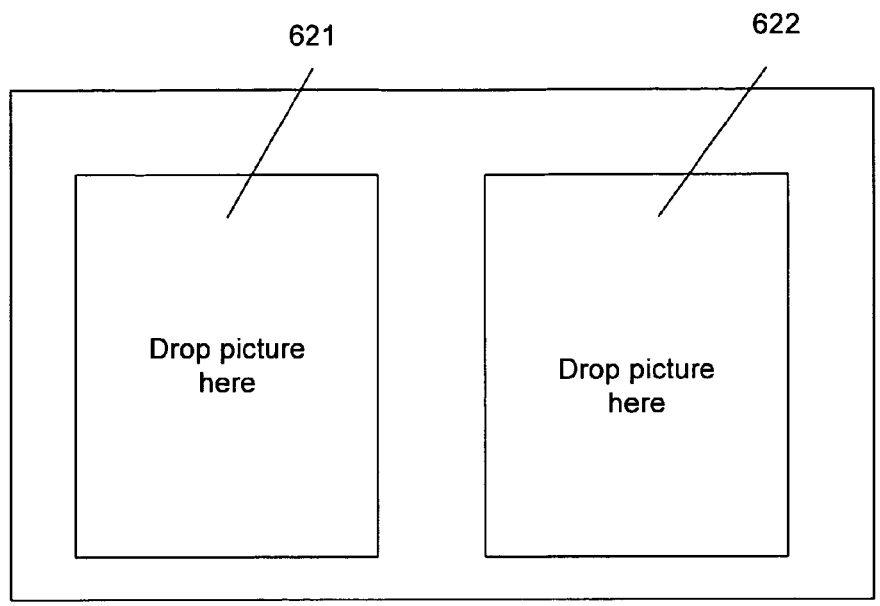
Figure 6:
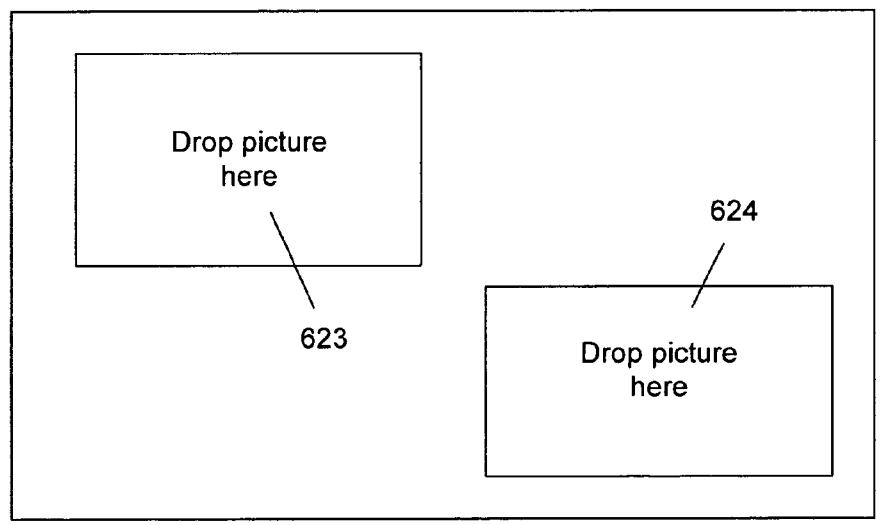

Each page of a digital photo album 200 may contain one or more digital images. Thus multiple page layouts are needed. FIG. 6 is an example of a library of page layouts covering all possible combinations of page layouts with digital images from one to three.

Figure 6E:
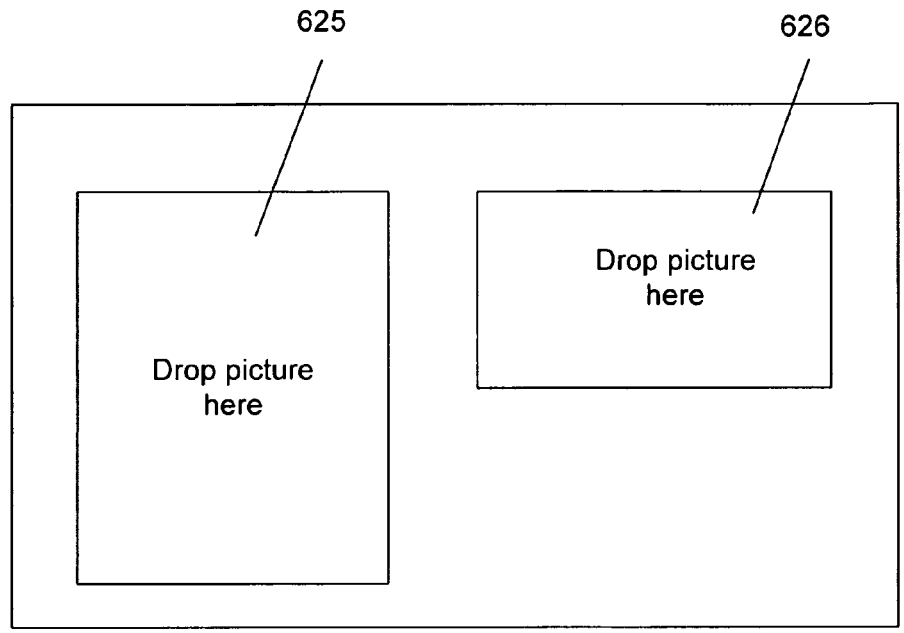
Figure 6F:
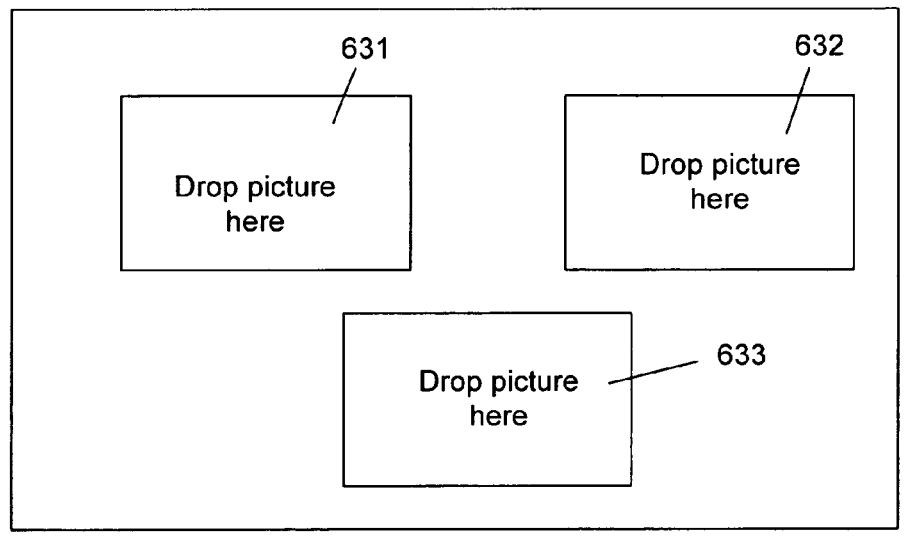
Figure 6G:
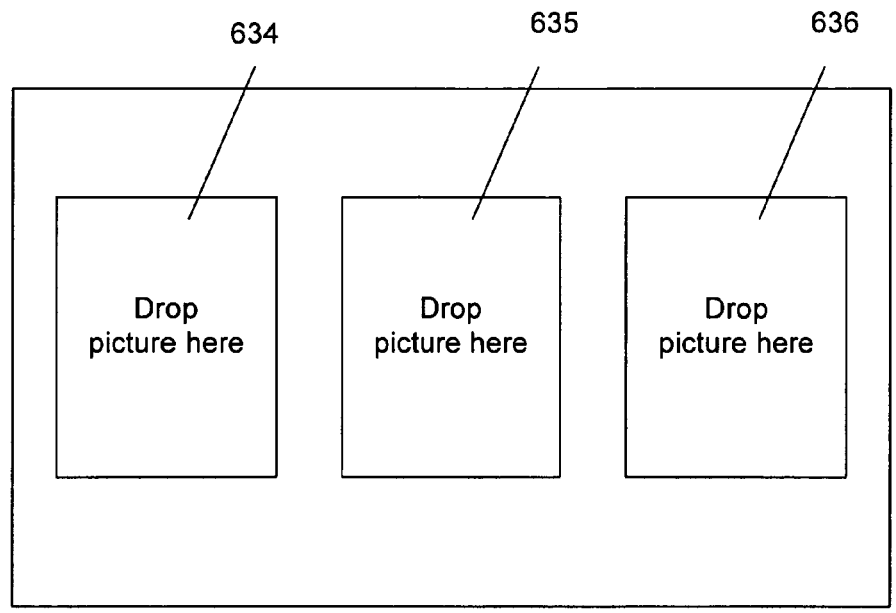
Figure 6H:
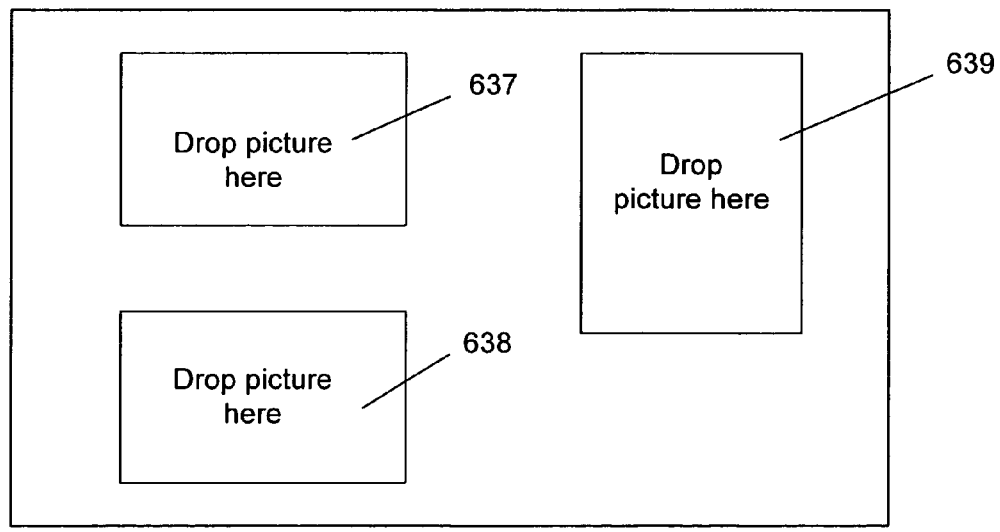
Figure 6I:
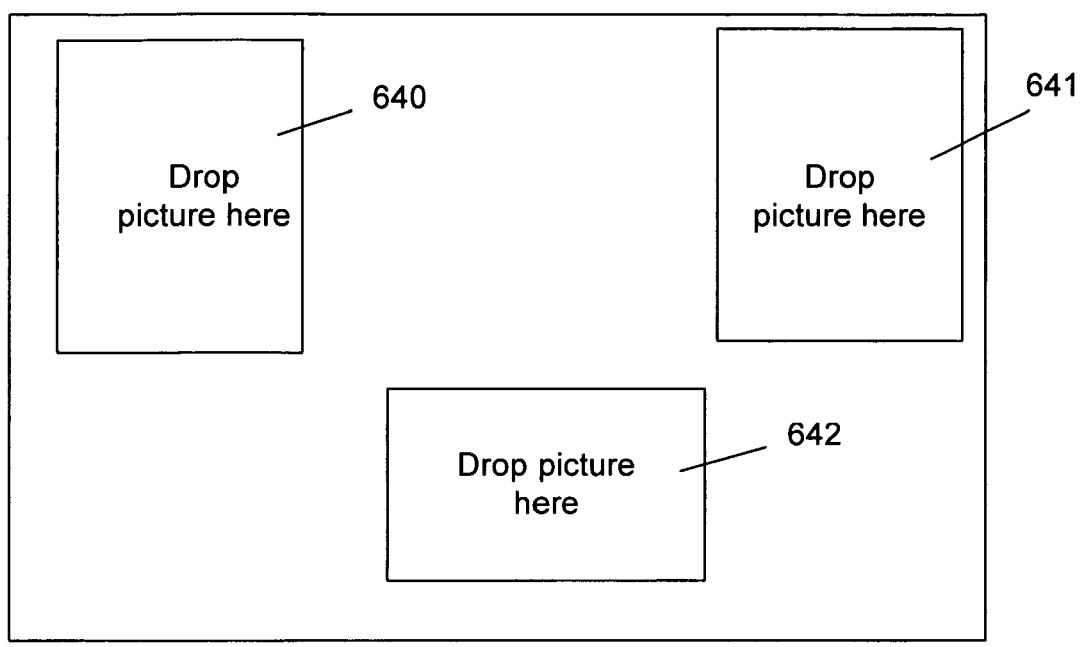

FIG. 6(a) contains one area 611 suitable for an image in landscape format. FIG. 6(b) shows an image holding area 612 suitable for an image in portrait format. FIG. 6(c) contains two portrait areas 621 and 622. FIG. 6(d) contains two landscape areas 623 and 624. FIG. 6(e) has one portrait image area 625 and one landscape area 626. FIG. 6(f) has three landscape areas 631, 632, and 633. FIG. 6(g) contains three portrait areas 634, 635, and 636. FIG. 6(h) contains two landscape areas 637 and 638, and one portrait area 639. FIG. 6(i) contains two portrait areas 641 and 642, as well as one landscape area 643.

With a library of page layout and a digital image list ready, the computer system 100 is ready to automatically populate digital images into a digital photo album 200.

The user first needs to instruct the computer system 100 how many pictures he or she wants on each page of the digital photo album. As shown in FIG. 7, there are several choices: 1 picture per page, 2 pictures per page, 3 pictures page, etc. The user can also select a mixed number of pictures per page. Alternatively, the computer can be installed with a program to automatically selecting the number of images for each page of the photo album. The automatic selection can be based on popular image layout. The user can conduct refinement and adjustment in the image layout after the completion automatic layout. The automatic layout can save significant amount of time when a large number of digital image are involved.

FIG. 8 is a flow diagram for the process of creating a digital photo album 200 when the user selects to have 1 picture on each page of the album. A digital image list 500 is loaded into the computer system 100 in step 801, coupled with the loading of a page layout library in step 802. The computer system 100 automatically selects and disposed the digital image at the top of the digital image list 500 in step 803. The selected images in the digital image list 500 are removed from the list in step 804. In step 805, the computer system 100 checks if the current digital image is landscape or portrait. If the current digital image is landscape, the computer system 100 drops the digital image in the picture area 611 of the page in FIG. 6(a) in step 806. If the current digital image is portrait, the computer system 100 drops the digital image in the picture area 612 of the page in FIG. 6(2) in step 807. In step 808, the computer system 100 adds the page that has just been processed in either step 806 or step 807 to the digital photo album 200 that is being created. In step 809, the computer system 100 checks if the digital image list 500 is empty. If the digital image list 500 is empty, it means all digital images in the list have been added to the digital photo album 200. The computer system 100 then sends the complete digital photo album 200 to a digital photo printer to print out the digital photo album in step 810. If the digital image list 500 is not empty, there are unused digital images on the list to be added to the digital photo album 200. In this case, the computer system 100 goes back to step 803 to select the next available digital image at the top of the digital image list 500. This loop is continued until all digital images in the digital image list 500 are used and added to the digital photo album 200.

FIG. 9 is a flow diagram for the process of creating a digital photo album 200 when the user selects to have 2 pictures on each page of the album. As in the process described in FIG. 8, a digital image list and a page layout are first loaded into the computer system 100 (not shown in FIG. 9). In step 903 the computer system 100 selects up two digital images from the digital image list 500 to dispose in the image areas. The selected images are removed from the image list 500 In step 905, the computer system 100 checks if the current two digital images are both landscape images. If they both are, the computer system 100 randomly drops the two digital images into picture areas 623 and 624 in FIG. 6(d). If the check in step 905 is "No", the computer system 100 checks in step 906 if both current digital images are portrait images. If they both are portrait images, the computer system 100 randomly drops the two digital images into the picture areas of 621 and 622 in FIG. 6(c). If the check in step 906 is "No", the only possibility is, one of the current digital images is landscape image and the other is portrait image. In this case, the computer system 100 drops the portrait image in the picture area 625 and the landscape image in the picture area 626 in FIG. 6(e) in step 909. When either steps 907, 908 or 909 is finished, the computer system 100, in step 910, adds the page created in either steps 907, 908 or 909 to the digital photo album 200 that is being created. Then in step 911, the computer system 100 checks if the digital image list 500 is empty. If the digital image list 500 is empty, it means all digital images in the list have been added to the digital photo album 200. The computer system 100 then sends the complete digital photo album 200 to a digital photo printer to print out the digital photo album in step 912. If the digital image list 500 is not empty, there are unused digital images on the list to be added to the digital photo album 200. In this case, the computer system 100 goes back to step 903 to select the next two available digital images at the top of the digital image list 500. This loop is continued until all digital images in the digital image list 500 are used and added to the digital photo album 200.

One problem may rise in step 903, when the computer system picks up the next two available digital images from the digital image list 500. Toward the end of the digital image list 500, there may be either one image left in the digital image list 500, or there may be two. In the case of two final digital images in the digital image list 500, the computer system 100 picks up the last two digital images and goes through the process in FIG. 9 and the finishes the process in step 912. In the case there is only one last digital image left in the digital image list 500, the computer system 100 picks up the last digital image and treats the second empty image as having the same format as the last available digital image. During the process, only steps 907 or 908 will be taken. In the final finished digital photo album 200, there will be one empty picture area at the last page. The user can either leave the finished digital photo album 200 as it is, or the user can manually add one more digital image to the open slot.

In the case the user selects three pictures per page for the digital photo album 200 to be created, the process is shown the flow diagram in FIG. 10. As in the flows in FIG. 8 and FIG. 9, a digital image list 500 and a page layout library are first taken by the computer system 100 (not shown in FIG. 10). In step 1003, the computer system 100 selects up three digital images from the digital image list 500. The selected images are then removed from the image list 500. In step 1005 the computer system 100 checks if all three selected digital images are of landscape format. If the check 1005 is "Yes", the computer system 100 randomly drops the three selected digital images into 631, 632 and 633 of FIG. 6(f). If the check 1005 results in "No", the computer system 100 checks, in step 1006, if all three selected digital images are of portrait format. If the check 1006 results in "Yes", the computer system 100, in step 1009, randomly drops the three selected digital images into 634, 635 and 636 in FIG. 6(g). If the check 1006 is "No", the computer system 100, in step 1007, checks if two of the three selected digital images are of landscape format and the third selected digital image is of portrait format. If the check 1007 results in "Yes", the computer system 100, in step 1010, drops randomly the two landscape digital images into 637 and 638 and the one portrait digital image in 639 in FIG. 6(h). If the check 1007 results in "No", the only possible combination is that two of the selected digital images are portrait images and the third one landscape. The computer system 100, in step 1011, randomly drops the two portrait digital images into 640, and 641, and the landscape digital image in 642 of FIG. 6(I). With either of the steps 1008, 1009, 1010 or 1011 finished, the computer system 100 adds the current page to the digital photo album 200 in step 1014 followed by a check 1012 to see if the digital image list 500 is empty. If the check 1012 is "Yes", all digital images in the digital image list 500 have been added to the digital photo album 200, and the computer system 100 sends the digital photo album to a digital printer in step 1013. If the check 1012 results in "No", there are unused digital images in the digital image list 500, and the computer system 100 goes back to step 1003. This loop is on until all digital images in the digital image list 500 are used in the digital photo album 200.

Like with the two pictures per page case, there is a possibility toward the end of the digital image list 500. When the computer system 100 enters step 1003 for the last time, there may be 1, 2 or 3 remaining digital images in the digital image list 500. In the case there are three remaining digital images in the digital image list 500, the computer system 100 goes through the ordinary process and selects the last three digital images.

In the case that there is one remaining digital image in the digital image list 500, there are two possibilities. If the remaining digital image is landscape, the computer system 100 produces the last page of the digital photo album 200 using the page layout of FIG. 6(f), with 631 filled with the last digital image in the digital image list 500, and 632 and 633 empty. If the remaining digital image is portrait, the computer system 100 produces the last page of the digital photo album 200 using the page layout of FIG. 6(g), with 634 filled with the last digital image in the digital image list 500, and 635 and 636 empty.

In the case there are remaining digital images in the digital image list 500, there are three different situations. (1) Both of the remaining digital images are landscape images. (2) Both of the remaining digital images are portrait images. (3) One of the remaining digital images is landscape image and the other portrait.

For situation (1), the computer system 100 uses the page layout of FIG. 6(f), filling 631 and 632 with the two remaining digital images, and leaving 633 empty.

For situation (2), the computer system 100 uses the page layout of FIG. 6(g), filling 634 and 635 with the two remaining digital images, and leaving 636 empty.

For situation (3), the computer system 100 used the page layout of FIG. 6(h), filling 637 with the remaining landscape digital image and 639 with the remaining portrait digital image and leaving 638 empty.

For the cases where there are one or two empty slots in the last page of the digital photo album 200, the user can either leave the finished digital photo album 200 as it is, or manually fill the open slot or slots with additional digital image or images.

In the case where the user selects "Mixed: A combination of 1, 2 or 3 digital images per page", the process to create the digital photo album 200 is shown in FIG. 11. As in FIGS. 8, 9, and 10, the computer system 100 first takes in a digital image list 500, together with a page layout library (steps not shown in FIG. 11). In step 1103, the computer system 100 randomly selects a number among 1, 2 or 3 for number of digital images on the current page of the digital photo album 200 that is being created. After the number of digital images is selected, the computer system 100 selects that number of digital images from the digital image list 500. The selected images are then removed from the image list 500. The computer system 100 then checks, in step 1105, if 1 digital image has been selected. If the check 1105 results in a "Yes", the computer system 100 drops the selected digital image in the current page in step 1107. The dropping of the selected digital image includes steps 805, 806, and 807 as shown in FIG. 8. If the check in step 1105 results in a "No", the computer system 100 further checks, in step 1106, if 2 digital images have been selected. If the check 1106 results in a "Yes", the computer system 100 drops the two selected digital images in the current page in step 1108, which includes steps 905, 906, 907, 908, and 909 in FIG. 9. If the check 1106 results in a "No", 3 digital images must have been picked. In this situation, the computer system 100 drops the three selected digital images to the current page in step 1109, which includes steps 1006, 1007, 1009, 1010 and 1011 in FIG. 10. After either of steps 1107, 1108, or 1109 is finished, the computer system 100 adds the current page to the digital photo album 200 in step 1110. Then the computer system 100 checks in step 1111 if the digital image list 500 is empty. If the digital image list 500 is empty, all digital images have been added to the digital photo album 200. The computer system 100 sends the digital photo album 200 to a digital printer in step 1112 to print out a hard copy of the digital photo album. If the digital image list 500 is not empty, there are unused digital images remaining to be added to the digital photo album 200. The computer goes to step 1103 and select more digital images to process. The loop continues until all digital images are selected and added to the digital photo album 200.

Since each page of the digital photo album 200 may have 1, 2, or 3 digital images in the "Mix" select mode, there is no empty image area in the last page of the digital photo album 200. The computer system 100 can always find out a page layout in FIG. 6 that fits the number of digital images on the page, as well as the image formats.

In addition to populating each page of a digital photo album 200 with one or more digital images, the user can add text to a album page or image captions specific one or more of the digital images. The user can also add a title to the photo album This is done in two steps. In step 1, a caption area 1201 or 1202 is reserved in a page layout as shown in FIGS. 12(a) and (b). In step 2, after the image areas are populated with digital images, the user can enter captions in the caption areas 1201 or 1202.

A page layout can also be featured with some pre-defined background images. For example, FIG. 13(a) has a background 1301 with a house, some cloud and a sun in the sky, while FIG. 13(b) has a background 1302 with some balloons. The user is free of changing the background for each and every page of the digital photo album 200. The background images can also be automatically selected by the computer in response to the image content, the title of the photo album or the captions for the images entered by the user.

While the automatic photo-album generation method tries to fit the format of each digital image on the digital image list 500 by selecting different page layouts, some cropping is unavoidable. This is because there is a good chance that the aspect ratio of an image area on a page layout does not match the aspect ratio of the source digital image. The user needs to determine which portion of each digital image needs to be cropped out.

In the situation where one or more digital images in the digital image list 500 are of a square format, the computer system 100 treats such digital images as if they were of portrait format. By dropping square digital images into portrait formatted digital image areas of a page layout, cropping of the square formatted digital images are needed.

The library of page layout contains layouts with 1, 2 or 3 digital images on each page. The method however is not limited to 3 digital images per page. It can be easily expanded to any number of digital images per page. Also, for a given number of digital images page and for the given formats of the digital images, the layout is not limited to the designs shown in this invention. There can be a large variation of layout designs for the same number of digital images with the same formats on each page. With an expanded layout library, the corresponding flow chart will be more complicated. But the same basic method follows.

The method of automatic photo-album generation gives a user a good start point in the creation of the digital photo album. The method fits the formats of each digital image on the digital image list with different page layouts in the layout library. Compared with manually select page layout for each page and manually dropping each digital image, this method saves time and efforts in digital image selecting as well as image cropping.

What is claimed is:

1. A method for producing a photo album having a plurality of pages, comprising:

storing a plurality of digital images each characterized by a portrait format or a landscape format;

specifying a sequence for the plurality of digital images;

providing a library of page layouts each comprising one or more image areas each of which is configured to receive a digital image characterized by a portrait format or a landscape format;

selecting a first group of one or more digital images at the beginning of the sequence of the plurality of digital images;

after the step of selecting a first group of one or more digital images, automatically selecting a page layout from the library of page layouts in accordance with the image formats of the one or more digital images in the first group; and disposing the first group of one or more digital images in the one or more image areas in the automatically selected page layout to produce a first page in a photo album.

2. The method of claim 1, wherein the step of disposing comprises automatically matching the image formats of one or more digital images in the first group with the associated image formats of the one or more image areas in the automatically selected page layout.

3. The method of claim 1, further comprising:
removing the first group of one or more digital images from the sequence of the plurality of digital images;
selecting a second group of one or more digital images at the beginning of the sequence of the plurality of digital images;
after the step of selecting a second group of one or more digital images, automatically selecting another page layout from the library of page layouts in accordance with the image formats of the one or more digital images in the second group; and
disposing the second group of one or more digital images in the one or more image areas in the page layout to produce a second page in the digital photo album.

4. The method of claim 1, wherein the first group comprises two digital images, wherein the page layout comprises two image areas configured to receive two portrait image, or two landscape image, or one portrait image and one landscape image.

5. The method of claim 1, further comprising:
automatically displaying in the automatically selected page layout having the first group of one or more digital images disposed in the one or more image areas.

6. The method of claim 1, further comprising:
before the step of selecting a first group of one or more digital images, determining the number of digital images in the first group; and
specifying the number of image areas on the first page in accordance with the number of digital images in the first group.

7. The method of claim 1, wherein the first group comprises three digital images, wherein the page layout comprises three image areas configured to receive three portrait image, or three landscape image, or one portrait image and two landscape images, or two portrait images and one landscape image.

8. The method of claim 1, wherein the page layout further comprises one or more image caption areas.

9. The method of claim 1, wherein the page layout further comprises a page background pattern.

10. The method of claim 9, wherein the page background pattern can be selected from a plurality of pre-designed page background patterns.

11. The method of claim 1, further comprising: after the step of selecting a first group of one or more digital images, automatically selecting the page layout from the library of page layouts in accordance with the number of images in the first group and the image formats of the one or more digital images in the first group.

12. The method of claim 1, wherein the first group comprise two images having a same image format, wherein the step of disposing comprises randomly disposing the two images having the same image format in two image areas associated with the same image format in the automatically selected page layout.

13. A method for producing a photo album having a plurality of pages, comprising:
storing a plurality of digital images each characterized by a portrait format or a landscape format;
specifying a sequence for the plurality of digital images;
providing a library of page layouts each comprising one or more image areas each of which is configured to receive a digital image characterized by a portrait format or a landscape format;
selecting a first group of one or more digital images at the beginning of the sequence of the plurality of digital images;
after the step of selecting a first group of one or more digital images, automatically selecting a first page layout from the library of page layouts in accordance with the image formats of the one or more digital images in the first group;
disposing the first group of one or more digital images in the one or more image areas in the automatically selected first page layout to produce a first page in a photo album;
after the step of disposing the first group of one or more digital images, selecting a second group of one or more digital images at the beginning of the sequence of the plurality of digital images;
after the step of selecting a second group of one or more digital images, automatically selecting a second page layout from the library of page layouts in accordance with the image formats of the one or more digital images in the second group, wherein the first page layout is different from the second page layout; and
disposing the second group of one or more digital images in the one or more image areas in the second page layout to produce a second page in the digital photo album.

14. The method of claim 13, wherein the first group and the second group comprise different numbers of digital images.

15. The method of claim 13, further comprising:
determining the number of digital images in the first group;
determining the number of digital images in the second group;
specifying the number of image areas on the first page in accordance with the number of digital images in the first group; and
specifying the number of image areas on the second page in accordance with the number of digital images in the second group.

16. The method of claim 13, further comprising: after the step of disposing the first group of one or more digital images, removing the first group of one or more digital images from the sequence of the plurality of digital images.

17. The method of claim 13, further comprising automatically displaying the first page and the second page in the digital photo album.

18. A method for producing a photo album having a plurality of pages, comprising:
storing a plurality of digital images each characterized by a portrait format or a landscape format;
specifying a sequence for the plurality of digital images;
providing a library of page layouts each comprising image areas each configured to receive a digital image characterized by a portrait format or a landscape format;

selecting a first group of digital images at the beginning of the sequence of the plurality of digital images, wherein the first group comprise two images having a same image format;

after the step of selecting a first group of digital images, automatically selecting a page layout from the library of page layouts in accordance with the image formats of the digital images in the first group; and disposing the first group of digital images in the image areas in the automatically selected page layout to produce a first page in a photo album, wherein the two images having the same image format are randomly disposed in two image areas associated with the same image format in the automatically selected page layout.

19. The method of claim 18, wherein the same image format is a landscape image format.

20. The method of claim 18, wherein the same image format is a portrait image format.

* * * * *